United States Patent [19]
Ohno et al.

[11] Patent Number: 5,901,733
[45] Date of Patent: May 11, 1999

[54] VALVE FOR DETECTING LIQUID SURFACE

[75] Inventors: Junya Ohno, Atsugi; Toshio Hattori, Sagamihara, both of Japan

[73] Assignees: Nissan Motor Co., Ltd.; Nifco Inc., both of Yokohama, Japan

[21] Appl. No.: 08/791,157

[22] Filed: Jan. 28, 1997

[30]    Foreign Application Priority Data

Jan. 31, 1996  [JP]  Japan ..................................... 8-035735
Oct. 21, 1996  [JP]  Japan ..................................... 8-277947

[51] Int. Cl.⁶ ................................................. F16K 24/04
[52] U.S. Cl. ............................................. 137/202; 137/43
[58] Field of Search ...................................... 137/43, 202

[56]              References Cited

U.S. PATENT DOCUMENTS

| | | | |
|---|---|---|---|
| 4,679,581 | 7/1987 | Mears | 137/202 X |
| 5,004,002 | 4/1991 | Kobyashi | 137/43 X |
| 5,028,244 | 7/1991 | Szlaga | 137/202 X |
| 5,172,714 | 12/1992 | Kobayashi et al. | 137/43 X |
| 5,449,029 | 9/1995 | Harris | 137/202 |
| 5,522,417 | 6/1996 | Tomioka et al. | 137/202 |
| 5,582,198 | 12/1996 | Nagino et al. | 137/202 X |
| 5,694,968 | 12/1997 | Devall et al. | 137/202 |

*Primary Examiner*—Gerald A. Michalsky
*Attorney, Agent, or Firm*—Kanesaka & Takeuchi

[57]            ABSTRACT

A valve for detecting a liquid surface used in a fuel tank is formed of a valve body having an orifice at an upper part thereof, a plurality of bottom through-holes formed at a bottom part thereof, and a plurality of surrounding wall through-holes formed at a surrounding part thereof; a valve member movably disposed inside the valve body to close the orifice; and an urging member for moving the valve member in cooperation with buoyancy of the valve member so as to close the orifice. In the valve of the invention, the diameter of the orifice is set to be larger than the diameter of the bottom through-holes, and also larger than a diameter of the surrounding wall through-holes. Therefore, the orifice can be prevented from being clogged by foreign substances.

6 Claims, 6 Drawing Sheets

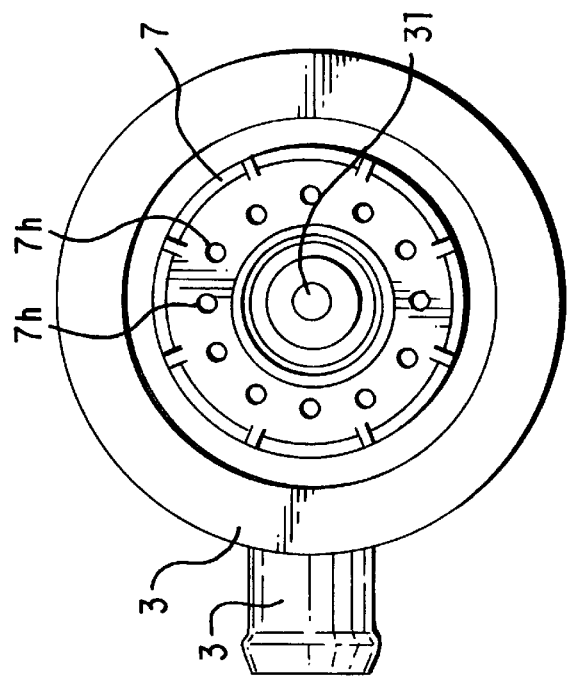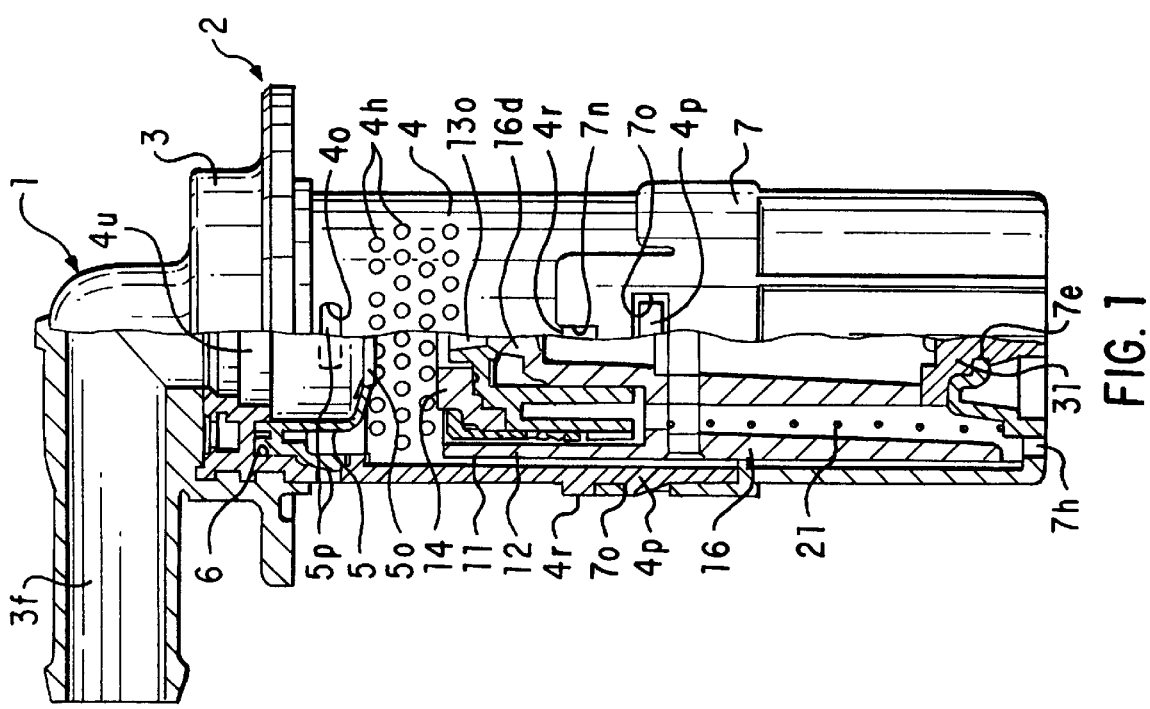

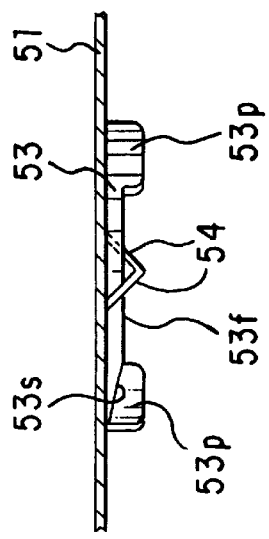
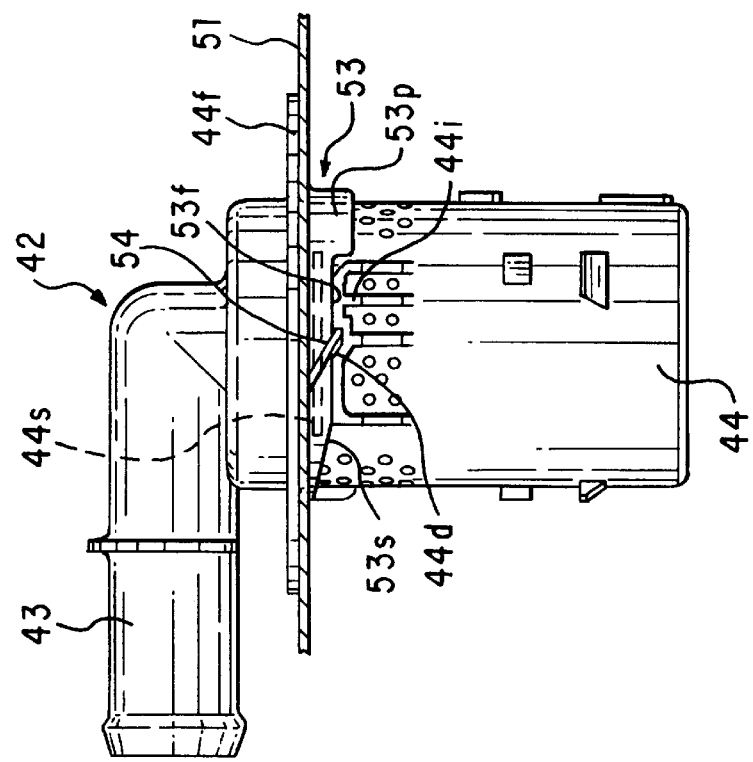
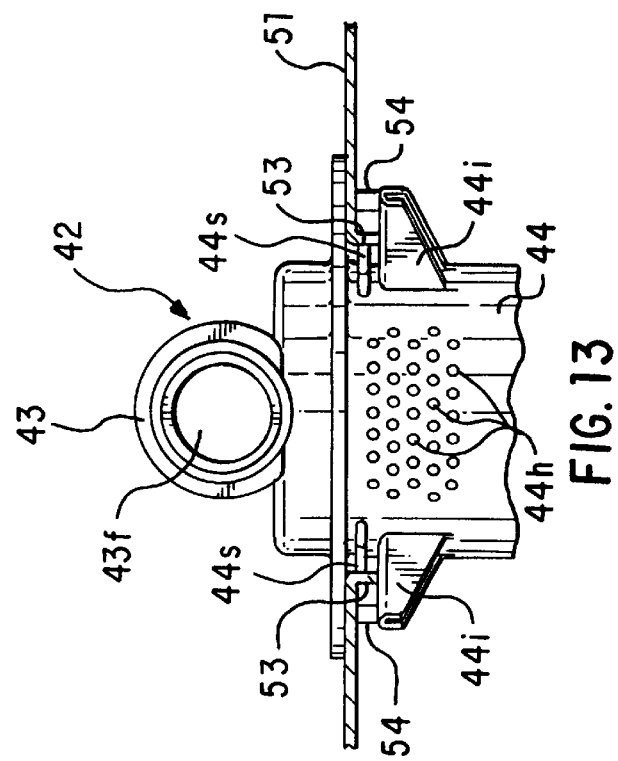

VALVE FOR DETECTING LIQUID SURFACE

BACKGROUND OF THE INVENTION AND RELATED ART STATEMENT

The present invention relates to a valve for detecting a liquid surface in a fuel tank, and the fuel tank to which the valve is attached, wherein an orifice partly facing an inside of the fuel tank and located at an upstream of a flow passageway for communicating between the fuel tank and a canister is closed by a valve member due to rising of the liquid surface.

For example, as disclosed in U.S. Pat. No. 5,028,244, a conventional valve for detecting the liquid surface is formed of a valve body having an orifice formed at an upper part thereof, a plurality of bottom through-holes formed at a bottom part thereof, and a plurality of peripheral wall through-holes formed at a peripheral wall; a valve member moving inside the valve body to open and close the orifice; and an urging member which can not close the orifice by moving the valve member against its own weight but which can close the orifice by moving the valve member in cooperation with buoyancy of the valve member.

A fuel tank provided with the valve for detecting the liquid surface as a full detecting valve and a cut valve is explained. In a normal condition, by an operation of a differential pressure valve communicating with both of the valves, communication between an inside of the fuel tank through the full detecting valve and the canister is shut off, and the inside of the fuel tank communicates with the canister through the cut valve.

Thus, fuel vapor in the fuel tank flows through the cut valve and the differential pressure valve into the canister.

When a cap is taken out to supply fuel into the fuel tank, a pressure inside the fuel tank is decreased to the atmosphere pressure, so that the differential pressure valve connects between the inside of the fuel tank and the canister through the full detecting valve, and cuts off the communication between the fuel tank and the canister through the cut valve.

Thus, when fuel is supplied by a fuel nozzle into the fuel tank, fuel vapor inside the fuel tank flows to the canister from the flow passageway through the bottom through-holes and the orifice, or through the peripheral wall through-holes.

Then, when the liquid surface of fuel rises and the valve member ascends in cooperation with its buoyancy and a force by the urging member, the valve member closes the orifice, so that the communication between the inside of the fuel tank and the canister is cut off.

When the orifice is closed as described above, the pressure inside the fuel tank is increased, and by detecting the increased pressure, controlling to stop supplying of fuel into the fuel tank can be done.

Also, when supplying of fuel into the fuel tank is finished, by the operation of the differential pressure valve, communication between the inside of the fuel tank and the canister through the full detecting valve is cut off, and the inside of the fuel tank communicates with the canister through the cut valve.

Incidentally, when the liquid surface of fuel descends from the full amount by using fuel, the valve member descends by its own weight against the urging force of the urging member, so that the orifice is opened.

In the aforementioned conventional valve for detecting the liquid surface, however, since a diameter of the orifice is set to be smaller than a diameter of the peripheral wall through-hole, in case foreign substances, such as dust, on the outer surface around the peripheral wall through-hole enter into the valve body together with the fuel vapor, the foreign substances entered into the valve body may clog the orifice.

Also, if the diameter of the peripheral wall through-hole is smaller than the diameter of the bottom through-hole, in case a part of the peripheral wall through-holes is soaked in fuel by swinging or moving of the automobile, the foreign substances entered together with the fuel vapor into the valve body through the peripheral wall through-holes may accumulate on the bottom part of the valve body.

The present invention has been made to solve the aforementioned problems, and it is an object of the present invention to provide a valve for detecting the liquid surface, wherein an orifice can not be clogged by foreign substances, the foreign substances can not accumulate on a bottom of a valve body, and a valve member can not be lifted by its force when fuel vapor flows out of the fuel tank.

Also, it is another object of the invention to provide a fuel tank, wherein an air passage resistance can not be increased by clogging of the peripheral wall through-holes due to the ascent of the liquid surface of fuel.

SUMMARY OF THE INVENTION

To achieve the aforementioned objects, the present invention provides a valve for detecting a liquid surface, which has a basic structure formed of a valve body having an orifice formed at an upper part thereof, a plurality of bottom through-holes formed at a bottom part thereof, and a plurality of peripheral wall through-holes formed at a surrounding wall thereof; a valve member moving inside the valve body to open and close the orifice; and an urging member cooperating with buoyancy of the valve member for moving the valve member so as to close the orifice. In the valve for detecting the liquid surface of the invention, the diameter of the orifice is made larger than the diameter of the bottom through-hole and the peripheral wall through-hole. Also, the valve member may be formed of a first float having a secondary orifice communicating with the orifice when the orifice is closed, and a second float for opening and closing the secondary orifice, wherein the diameter of the secondary orifice is made larger than the diameter of the bottom through-hole.

It is preferable that the diameter of the secondary orifice is made larger than the diameter of the peripheral wall through-hole, and/or the diameter of the bottom through-hole is made larger than the diameter of the surrounding wall through-hole.

Also, according to another aspect of the invention, a valve for detecting a liquid surface has the basic structure as stated above, wherein an upper rim of the valve member in the lowest descending position is located lower than the peripheral wall through-holes, and the total areas of the peripheral wall through-holes are set to be larger than the total areas of the bottom through-holes; or the total areas of the peripheral wall through-holes are set to be more than twice of the area of the opening of the orifice, and the total areas of the bottom through-holes are set less than a half of the opening of the orifice.

It is also desirable to set the diameter of the bottom through-hole larger than the diameter of the peripheral wall through-hole.

Furthermore, according to a further aspect of the invention, a valve for detecting a liquid surface has the basic structure as stated above, wherein at a rim of the peripheral wall through-hole on the outer surface of the peripheral wall part, ribs are provided.

Moreover, according to a still further aspect of the invention, a valve for detecting a liquid surface has the basic structure as stated above, wherein the valve body has an attachment part for holding a part of the fuel tank by rotating and an attachment flange on an outer surface of the peripheral wall part. Also, on the outer surface of the peripheral wall part between the attachment part and the attachment flange, a plurality of projections for contacting a part of the fuel tank is disposed.

Further, according to a still further aspect of the invention, there is provided a fuel tank attached with a valve for detecting the liquid surface, which is formed of a valve body having an orifice formed at an upper part thereof, a plurality of bottom through-holes formed at a bottom part thereof, and a plurality of peripheral wall through-holes formed at a surrounding wall thereof; a valve member moving inside the valve body to open and close the orifice; and an urging member cooperating with buoyancy of the valve member for moving the valve member so as to close the orifice. In the fuel tank, the peripheral wall through-holes are disposed to be located above a waterline or fuel line when the valve member closes the orifice.

BRIEF DESCRIPTION OF THE DRAWINGS

FIG. 1 is a partly cut side view of a valve for detecting a liquid surface as a first embodiment of the present invention, which shows a left half thereof as a sectional view;

FIG. 2 is a bottom plan view of the valve for detecting the liquid surface as shown in FIG. 1;

FIG. 11 is a partial view of the bracket shown in FIG. 10, as seen from the lower side of FIG. 10;

FIG. 12 is an explanatory view showing a state that the valve for detecting the liquid surface of the third embodiment is attached to the bracket; and FIG. 13 is an explanatory view corresponding to FIG. 8, wherein the valve for detecting the liquid surface of fuel of the third embodiment is attached to the bracket and the bracket is partly cut.

DETAILED DESCRIPTION OF PREFERRED EMBODIMENTS

Embodiments of the invention are explained with reference to the attached figures hereinafter.

Figure 3:
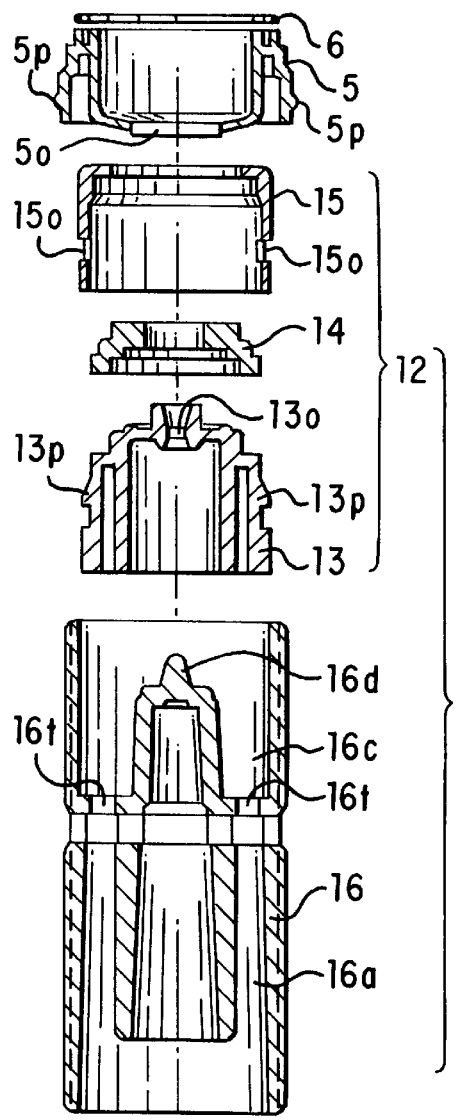
FIG. 3 is an exploded sectional view of a valve member and so on shown in FIG. 1.
Figure 4A:
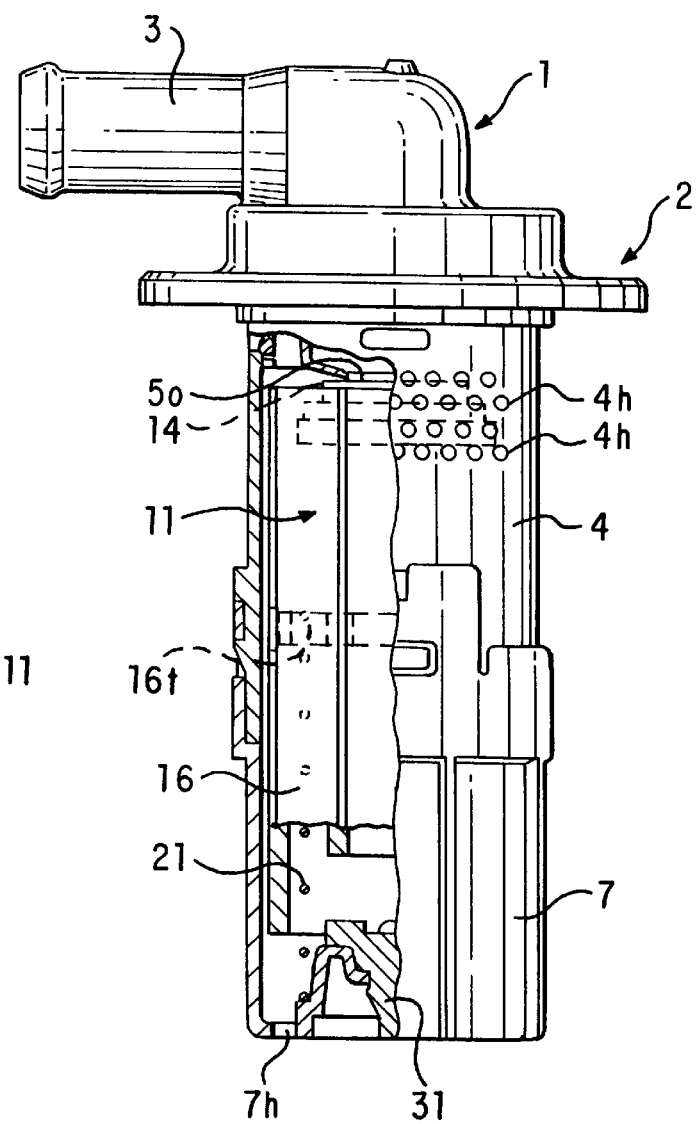
FIG. 4(a) is an explanatory view of the valve for detecting the liquid surface as shown in FIG. 1.
Figure 4B:
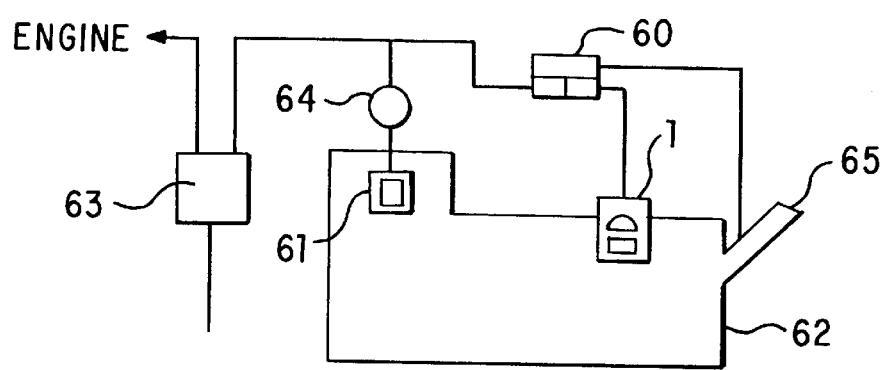
FIG. 4(b) is a block diagram for showing the connection of the valve to a fuel tank.

FIG. 1 is a side view of a valve for detecting a liquid surface as a first embodiment of the present invention, showing a left half thereof as a sectional view; FIG. 2 is a bottom view of the valve for detecting the liquid surface as shown in FIG. 1; FIG. 3 is an exploded sectional view of the valve member and so on as shown in FIG. 1; FIG. 4(a) is an explanatory view of the valve for detecting the liquid surface as shown in FIG. 1; and FIG. 4(b) is a block diagram for showing the connection of the valve to a fuel tank.

Incidentally, FIG. 1 shows a condition in which an orifice and a secondary orifice are opened, and FIG. 4(a) shows a condition in which the orifice and the secondary orifice are closed.

In the above figures, a valve body designated by numeral 1 is formed of an upper body 2 made of resin which has enough rigidity and can be molded with high accuracy in dimension; and a lower body 7 attached to a lower portion of the upper body 2 to thereby close an open portion of the upper body 2, and made of resin which has enough rigidity and can be molded with high accuracy in dimension.

The upper body 2 is formed of an attachment part 3 in which a flange is fuse-bonded to the fuel tank, a barrel portion 4 formed integrally with the attachment part 3 and having a ceiling and an open lower side, a seal ring 5 attached to the barrel portion 4, and an O-ring 6 for sealing between the seal ring 5 and the barrel portion 4.

In the attachment part 3, there is provided an L-shaped flow passageway 3f communicating with an orifice 5o in the seal ring 5.

In the barrel portion 4, a central portion of an upper surface thereof is provided with an opening 4u communicating with the flow passageway 3f. In a peripheral or surrounding wall, a plurality of peripheral or surrounding wall through-holes 4h and a plurality of engaging holes 4o located above the through-holes 4h are disposed. In the outer peripheral surface, the lower end portion thereof is provided with a plurality of engaging protrusions 4p and a plurality of positioning protrusions 4r located above the engaging protrusions 4p.

Also, the seal ring 5 has a barrel shape with a bottom and an open upper side, and a central portion of the bottom is provided with the orifice 5o having a lower end with the horizontal surface. On the outer peripheral surface, a plurality of engaging protrusions 5p for fitting into the engaging holes 4o is disposed.

The lower body 7 has a barrel shape with a bottom and an open upper side, and at a central portion of the bottom, there are formed an attachment hole 7e and a plurality of bottom through-holes 7h located on a circle having a center at the attachment hole 7e. At the upper end portion of the outer peripheral surface, there are formed a plurality of positioning notches 7n engaging the positioning protrusions 4r, and a plurality of engaging holes 7o located lower than the positioning notches 7n and engaging the engaging protrusions 4p.

Incidentally, the attachment part 3 is formed of resin which can be fuse-bonded to the fuel tank, and the upper and lower bodies 2, 7 and the seal ring 5 are formed of resin which are not damaged by fuel. Also, the O-ring 6 is formed not to be damaged by fuel.

A valve member housed in the valve body 1 and designated by numeral 11 is formed of a first float 12 for opening and closing the orifice 5o, and a second float 16 ascending together with the first float 12 and descending separately from the first float 12.

The aforementioned first float 12 has a barrel shape with a ceiling and an open lower side, and is formed of a float member 13 having a secondary orifice 13o formed at an upper central part thereof, and a plurality of engaging protrusions 13p provided on the outer peripheral surface thereof; a ring-shaped seal rubber 14 disposed on the float member 13 not to close the secondary orifice 13o and having a horizontal upper surface for opening and closing the orifice 5o; a cap 15 having at a surrounding wall portion a plurality of engaging holes 15o for engaging the engaging protrusions 13p, the cap 15 being attached to the float member 13 such that the cap 15 can be movable in a vertical direction on the seal rubber 14.

The second float 16 is provided at the upper side with a concave portion 16c for accommodating the first float 12, and a valve head 16d located in a center of the concave portion 16c and used for opening and closing the secondary orifice 13o. Also, the second float 16 is provided at a lower side with a concave portion 16a for accommodating a coil spring 21 explained later, and at a middle part in the vertical direction, through-holes 16t for communicating between the concave portions 16a, 16c.

Incidentally, the float member 13, the cap 15 and the second float 16 are formed of resin which is not damaged by fuel, and the seal rubber 14 is formed also not to be damaged by fuel.

When the valve member 11 is in the lowest descending position, an upper end periphery of the valve member 11 is positioned lower than a plurality of the surrounding wall through-holes 4h.

A coil spring designated by numeral 21 as an urging member is set to have an urging force such that the orifice 5o can not be closed by moving the second float 16 against its own weight, but the orifice 5o can be closed by moving the valve member 11 with a help of buoyancy of the valve member 11.

Numeral 31 designates a cushion as a buffer to prevent a noise caused when the second float 16 hits the lower body 7, and the cushion 31 is attached to an attachment hole 7e.

Here, the diameter of the orifice 5o is designated as $D_1$; the area of an opening of the orifice 5o is designated as $S_1$; the diameter of the secondary orifice 13o is designated as $D_2$; the diameter of the bottom through-hole 7h is designated as $D_3$; the total areas of the bottom through-holes 7h are designated as $S_3$; the diameter of the surrounding wall through-hole 4h is designated as $D_4$; and the total areas of the surrounding wall through-holes 4h are designated as $S_4$. The relationship among the aforementioned diameters is set to be $D_1 > D_2 > D_3 > D_4$, and the relationship among the aforementioned areas is set to be $S_4 > S_1, S_3$.

The weight of the second float 16 is heavier than that of the first float 12.

The valve for detecting the liquid surface of the first embodiment of the invention is provided as a full detecting valve, and the operation of the fuel tank provided with a cut valve is explained with reference to FIG. 4(b), as follows.

In the normal condition, by an operation of a differential pressure valve 60 communicating with the full detecting valve 1 and the cut valve 61, communication between the fuel tank 62 and a canister 63 through the full detecting valve 1 is cut off, and the fuel tank 62 communicates with the canister 63 through the cut valve 61 and a check valve 64.

Therefore, fuel vapor in the fuel tank 62 flows into the canister 63 through the cut valve and the check valve.

Then, in the full detecting valve 1 under the normal condition, as shown in FIG. 1, the valve member 11 descends by its own weight against the urging force of the coil spring 21, such that the valve member 11 opens the orifice 5o and the valve head 16d closes the secondary orifice 13o.

Next, when a cap 65 of the fuel tank 62 is removed to fill fuel into the fuel tank 62, the pressure inside the fuel tank 62 is decreased to the atmosphere pressure, so that the differential pressure valve 60 connects between the fuel tank 62 and the canister 63 through the full detecting valve 1, and cuts off the communication between the fuel tank 62 and the canister 63 through the cut valve 61.

Thus, when fuel is supplied through a fuel nozzle, fuel vapor flows from the flow passageway 3f to the canister 63 mainly through The surrounding wall through-holes 4h, the orifice 5o and the opening 4u.

As the surface of fuel ascends, the valve member 11 ascends by buoyancy thereof and the urging force of the coil spring 21. Accordingly, the seal rubber 14 closes the orifice 5o to thereby cut off the communication between the fuel tank 62 and the canister 63 through the pressure valve 60.

When the orifice is closed as described above, the pressure inside the fuel tank is increased. By detecting the increased pressure, it can be controlled to stop providing fuel into the fuel tank.

And, when filling of fuel into the fuel tank is completed, by the operation of the differential pressure valve 60, communication between the fuel tank 62 and the canister 63 through the full detecting valve 1 is cut off, and the inside of the fuel tank communicates with the canister 63 through the cut valve 61 and the check valve 64.

Next, when the surface of fuel descends for the predetermined amount from the full amount by using fuel, as described above, since the diameter $D_2$ of the secondary orifice 13o is smaller than the diameter of the orifice $D_1$, in other words, since the area in which the valve head 16d contacts the float member 13 as a valve seat is smaller than the area in which the seal rubber 14 contacts the seal ring 5 as a valve seat, and since a force by which the valve head 16d sticks to the float member 13 is less than a force by which the seal rubber 14 sticks to the seal ring 5, the second float 16 immediately opens the orifice 13o by its own weight.

Then, since the second float 16 opens the secondary orifice 13o, the force by which the seal rubber 14 sticks to the seal ring 5 becomes weak. Thus, the seal rubber 14 immediately opens the orifice 5o by its own weight.

When the second float 16 descends to open the secondary orifice 13o as explained above, the second float 16 bumps and contacts the lower body 7 through the cushion 31, the bumping sound, i.e. noise, does not occur.

As described above, according to the first embodiment of the invention, since the diameter $D_1$ of the orifice 5o and the diameter $D_2$ of the secondary orifice 13o are set to be larger than the diameter $D_3$ of the bottom through-hole 7h and the diameter $D_4$ of the surrounding wall through-hole 4h, foreign substances by which the orifices 5o and 13o are clogged do not enter into the valve body 1, so that the orifices 5o and 13o are not clogged.

Furthermore, since the total areas $S_4$ of the surrounding wall through-holes 4h are larger than the total areas $S_3$ of the bottom through-holes 7h, when fuel is filled into the fuel tank, the fuel vapor flows into the valve body 1 mainly through the surrounding wall through-holes 4h. Thus, the valve member 11 is hardly lifted by the pressure of the fuel vapor flown form the fuel tank.

At this moment, the valve member 11 is located in the lowest descending position lower than the surrounding wall through-holes 4h; the total areas $S_4$ of the surrounding wall through-holes 4h are larger than the area $S_1$ of the opened orifice 5o; and the lower end surface of the orifice 5o is on a horizontal surface, and the upper surface of the seal rubber 14 is on the horizontal surface to thereby decrease the flow passage into the orifice 5o linearly. Accordingly, a part of the fuel vapor flown into the valve body 1 pushes down the valve member 11, so that the valve member 11 is hardly lifted up by the pressure of the fuel vapor from the fuel tank.

Also, since the diameter $D_3$ of the bottom through-hole 7h is set to be larger than the diameter $D_4$ of the surrounding wall through-hole 4h, the foreign substances flown through the surrounding wall through-holes 4h into the valve body 1 can flow out of the valve body 1 through the bottom through-holes 7h. Thus, the foreign substances does not accumulate on the bottom of the valve body 1.

Also, since the seal ring 5 provided with the orifice 5o is formed separately from the barrel portion 4, by attaching the seal ring with a different height, the height of the fuel surface in the full tank, i.e., the storage amount of fuel, can be adjusted.

Further, since the cushion 31 is provided between the bottom of the valve body 1 and the valve member 11, the valve member 11 bumps with the valve body 1 through the cushion 31. Thus, the bumping sound, i.e. noise, is not produced.

Figure 5:
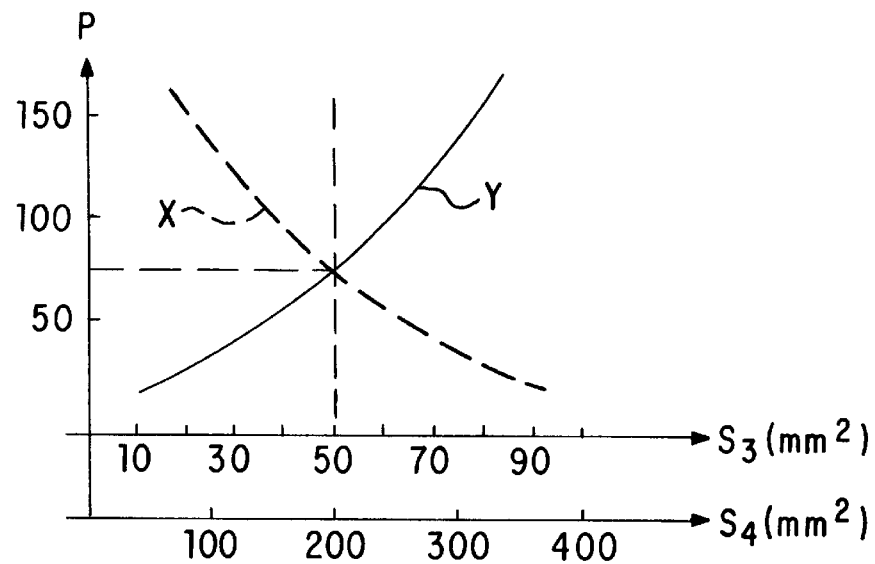
FIG. 5 is a characteristic graph of pressures necessary to lift a valve member when the total areas of the peripheral wall through-holes and the total areas of the bottom through-holes are changed with respect to an area of an orifice, the graph explaining a valve for detecting the liquid surface as a second embodiment of the invention.

FIG. 5 is a characteristic graph of pressures necessary to lift a valve member when the total areas of the surrounding wall through-holes and the total areas of the bottom through-holes are changed with respect to an opening of an orifice, for explaining a valve for detecting the liquid surface as a second embodiment of the invention.

This characteristic graph shows the pressure to lift the valve member 11 when an inner pressure in a space of the valve member 11 side, i.e. normally an inner pressure in the fuel tank, is increased in a condition that the flow passageway 3f communicating with the orifice 5o is closed, and then the flow passageway 3f is suddenly opened, the graph showing the pressures by changing the total areas $S_4$ of the surrounding wall through-holes 4h and the total areas $S_3$ of the bottom through-holes 7h.

Incidentally, the valve for detecting the liquid surface of the second embodiment is constructed as same as the first embodiment.

In FIG. 5, a vertical axis shows a pressure P, and a horizontal axis shows the total areas $S_3$, $S_4$, wherein the pressure P is the pressure necessary to lift the valve member. Namely, as the pressure P becomes higher, it becomes difficult to lift the valve member 11.

A curve designated by X shows the pressure P which is necessary to lift the valve member 11 when the area of the opened orifice 5o is 100 mm$^2$ and the total areas $S_3$ of the bottom through-holes 7h are changed between 10 mm$^2$ and 90 mm$^2$.

A curve designated by Y shows the pressure P which is necessary to lift the valve member 11 when the opening area of the orifice 5o is 100 mm$^2$ and the total areas $S_4$ of the surrounding wall through-holes 4h are changed between 40 mm$^2$ and 360 mm$^2$.

Incidentally, the curves X, Y are substantially symmetrical to each other along a line passing through a point of 50 mm$^2$ in the total areas $S_3$ and a point of 200 mm$^2$ in the total areas $S_4$ and being parallel to the vertical line.

In case the fuel vapor enters only through the surrounding wall through-holes 4h, the valve member 11 is not easily lifted. When the total areas $S_4$ of the surrounding wall through-holes 4h are more than twice of the area $S_1$ of the orifice 5o, in case the fuel vapor is flown into the valve body 1 only from the surrounding wall through-holes 4h, the valve member 11 is not lifted, and at the same time, flowing areas of the surrounding wall through-holes 4h through which the fuel vapor passes can be obtained sufficiently.

When the total areas $S_3$ of the bottom through-holes 7h are less than a half of the area $S_1$ of the orifice 5o, a pressure P flowing into the valve body 1 from the bottom through-holes 7h becomes less than the weight thereof. Therefore, the valve 11 is not lifted.

Accordingly, when the total areas $S_4$ of the surrounding wall through-holes 4h are more than twice of the area $S_1$ of the orifice 5o and at the same time, the total areas $S_3$ of the bottom through-holes 7h are less than a half of the area $S_1$ of the orifice, the valve member 11 can not be lifted. Even if the fuel vapor flows into the valve body 1 only through the surrounding wall through-holes 4h, it is possible to obtain sufficient flowing areas in the surrounding wall through-holes 4h through which the fuel vapor passes.

Figure 6:
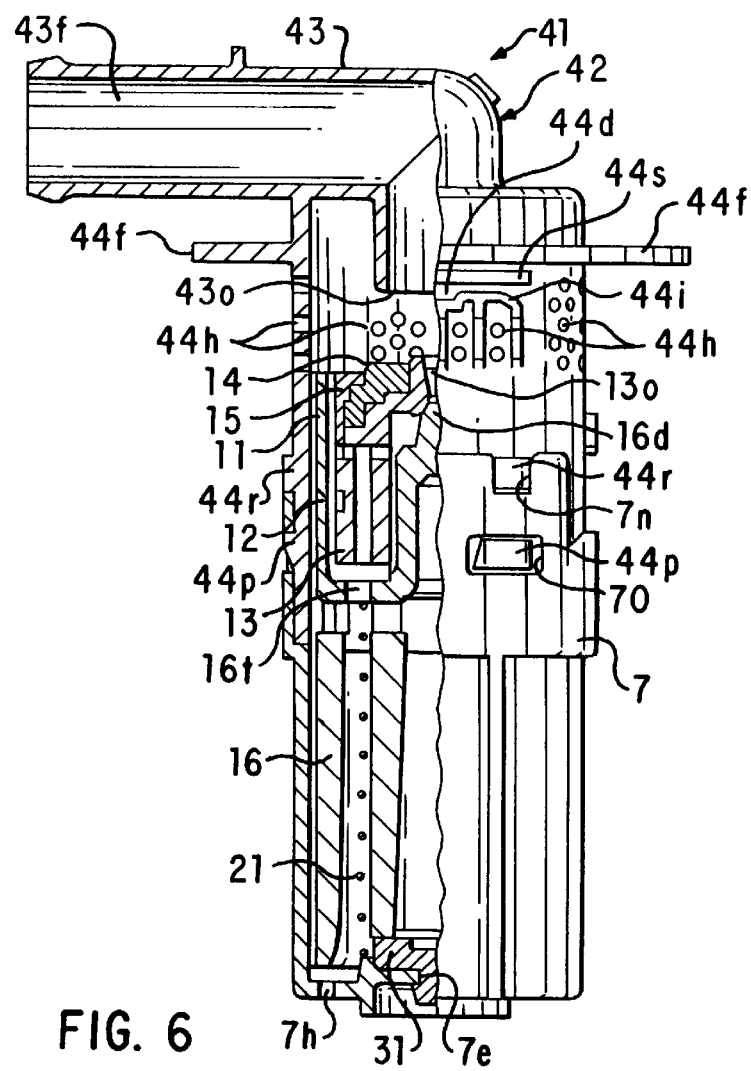
FIG. 6 is a partly cut side view of a valve for detecting the liquid surface as a third embodiment of the present invention, which shows a left half thereof as a sectional view.
Figure 7:
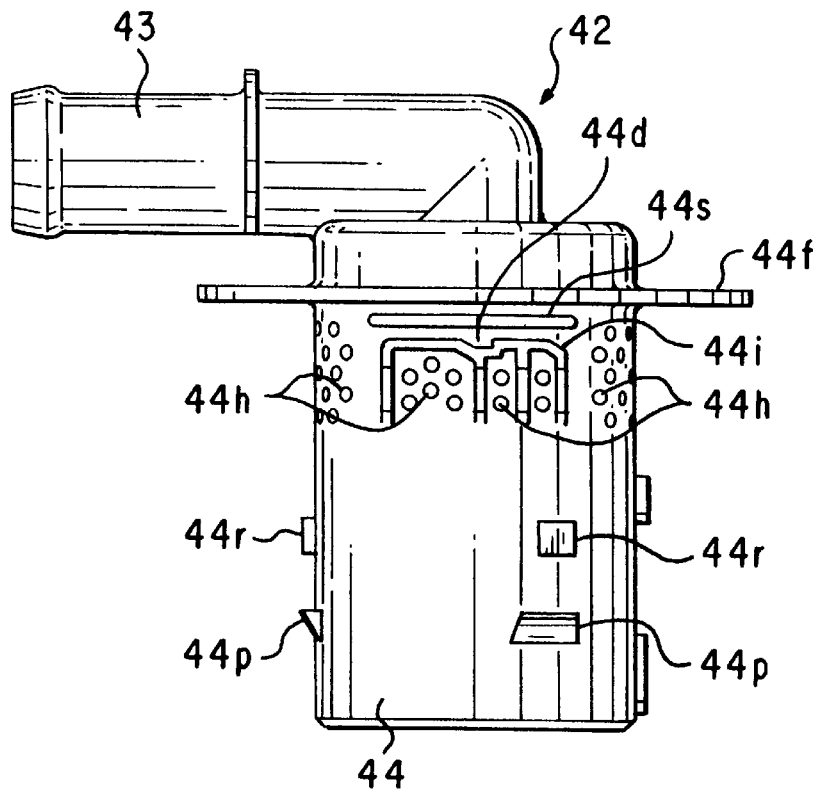
FIG. 7 is a side view of an upper body shown in FIG. 6.
Figure 8:
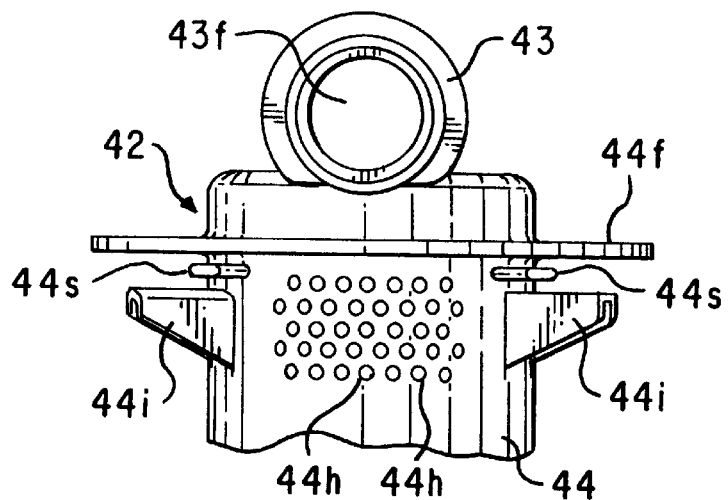
FIG. 8 is a front partial view of a main part showing the upper body as seen from the left side of FIG. 7.
Figure 9:
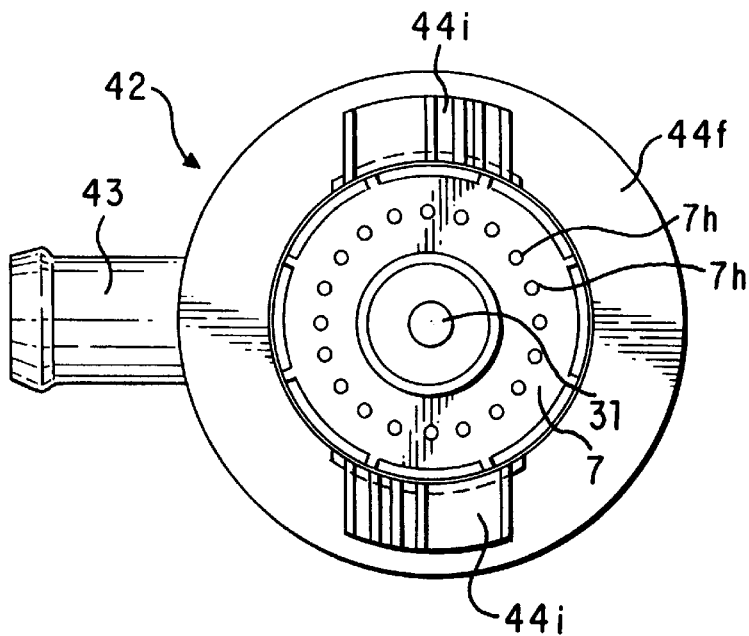
FIG. 9 is a bottom plan view of the valve for detecting the liquid surface as shown in FIG. 6.
Figure 10:
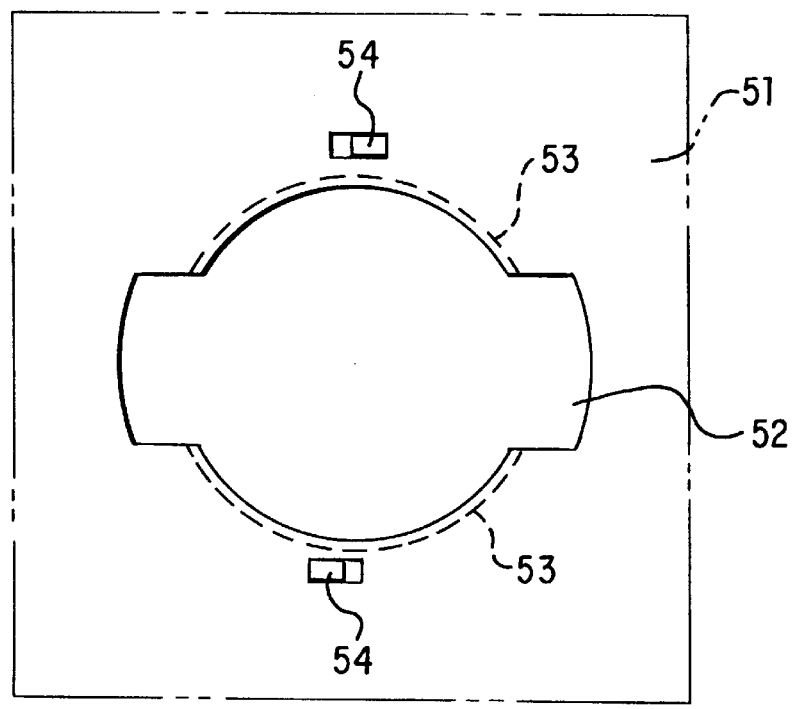
FIG. 10 is a plan view showing a part of a bracket to be attached inside the fuel tank.

FIG. 6 is a side view of a valve for detecting the liquid surface as a third embodiment of the present invention, showing a left half thereof as a sectional view; FIG. 7 is a side view of an upper body shown in FIG. 6; FIG. 8 is a front partial view of the upper body shown in FIG. 7, showing a main part thereof as seen from the left side; FIG. 9 is a bottom plan view of the valve for detecting the liquid surface shown in FIG. 6; FIG. 10 is a plan view showing a part of a bracket to be attached inside the fuel tank; FIG. 11 is a partial view of the bracket shown in FIG. 10, as seen from the lower side of FIG. 10; FIG. 12 is an explanatory view showing a state in which the valve for detecting fuel of the third embodiment is attached to the bracket; and FIG. 13 is an explanatory view showing that the valve for detecting fuel of the third embodiment is attached to the bracket and is partly cut, the view corresponding to FIG. 8. Parts which are the same as or corresponding to those shown FIGS. 1 through 4(b) are designated by the same numerals, so that the explanation thereof is omitted herewith.

Incidentally, in FIGS. 12 and 13, only a main part of the valve for detecting fuel is shown.

In these figures, a valve body designated by numeral 41 is formed of an upper body 42 made of resin which has enough rigidity and can be molded with high accuracy in dimension; and a lower body 7 attached to a lower portion of the upper body 42 to close a lower open portion of the upper body 42, and made of resin which has enough rigidity and can be molded with high accuracy in dimension.

The upper body 42 is formed of a pipe portion 43 having a horizontal orifice 43o at one end thereof and an L-shaped flow passageway 43f therein, and a barrel portion 44 having an open lower side and a ceiling through which an end of the pipe portion 43 is inserted.

On a surrounding wall portion of the aforementioned barrel portion 44, there are provided a plurality of surrounding wall through-holes 44h; a plurality of engaging protrusions 44p engaging the engaging holes 7o of the lower body 7 at a lower portion of an outer periphery of the surrounding wall; a plurality of positioning protrusions 44r located on the outer periphery above the engaging protrusions 44p and engaging the positioning notches 7n of the lower body 7; a doughnut-shaped or annular attachment part 44f located on the outer periphery above the plurality of surrounding wall through-holes 44*h*, a C-shaped ribs 44*i* facing the attachment part 44*f* with a predetermined space and opening at lower sides thereof, the ribs being arranged with 180 degrees spaced apart from each other on the outer periphery at edge areas of the plurality of surrounding wall through-holes 44*h*; and projections 44*s*, each being located on the outer periphery between the rib 44*i* and the attachment part 44*f* with 180 degrees spaced apart from each other, the projections 44*s* contacting bent pieces 53 of a bracket 51 explained later.

Incidentally, the lower body 7 and the valve member 11 are constructed as in the first embodiment, and the end of the pipe portion 43 inserted into the barrel portion 44 becomes the orifice 43*o*.

When the valve member 11 is in the lowest descending position, the upper rim of the valve member 11 is located lower than the plurality of the surrounding wall through-holes 44*h*.

Further, the ribs 44*i* also function as an attachment flange, and on a surface of each rib 44*i* facing the attachment portion 44*f*, an engagement groove 44*d* extending in a radial direction of the barrel portion 44 is formed. The upper body 42 is formed of resin which can not be damaged by fuel.

Numeral 51 designates a metallic bracket attached inside the fuel tank, which includes an attachment hole 52 having a shape of a combination of a circle and an oblong and closed by the attachment portion 44*f* of the barrel portion 44; the bent pieces 53 bent substantially vertically and symmetrically relative to a central point of the attachment hole 52 from a rim of the attachment hole to an inner side; and engagement pieces 54 cut and bent inwardly to engage the engaging grooves 44*d* of the ribs 44*i*, cut holes for the engagement pieces 54 being closed by the attachment portion 44*f* of the barrel portion 44.

And, in each bent piece 53, one end of a lower horizontal surface 53*f* becomes an ascending slope 53*s*, and the other end of the horizontal surface 53*f* is provided with a stopper 53*p*.

Incidentally, a space between the upper surface of the bracket 51 and the horizontal surface 53*f* of the bent piece 53 is equal to the space between the attachment portion 44*f* and the rib 44*i*.

The diameter of the attachment hole 52, i.e. diameter of the bent piece 53, is set to be the diameter of the projections 44*s* provided on the barrel portion 44.

Further, the diameter of the orifice 43*o* is designated as $D_1$; the area of an opening of the orifice 43*o* is designated as $S_1$; the diameter of the secondary orifice 13*o* is designated as $D_2$; the diameter of the bottom through-hole 7*h* is designated as $D_3$; the total areas of the bottom through-holes 7*h* are designated as $s_3$; the diameter of the surrounding wall through-hole 44*h* is designated as $D_4$; and the total areas of the surrounding wall through-holes 44*h* are designated as $S_4$. The relationship among the aforementioned diameters is set to be $D_1>D_2>D_3>D_4$, and the relationship among the aforementioned areas is set be $S_4>S_1$, $S_3$.

Next, the attachment of the valve for detecting the liquid surface to the fuel tank is explained as follows.

Firstly, the side of the lower body 7 of the valve body 41 is arranged to face downwardly, and the attachment portion 44*f* and the ribs 44*i* in the barrel portion 44 are fitted to the oblong parts of the attachment hole 52.

Then, after the side of the lower body 7 is inserted into the attachment hole 52 such that the attachment portion 44*f* contacts the upper surface of the bracket 51, the valve body 41 is rotated in a counter-clockwise direction in FIG. 10.

By rotating the valve body 41 as described above, the ribs 44*i* are guided on the slopes 53*s* and the horizontal surfaces 53*f* in the bent pieces 53 and abut against the stopper 53*p*. Also, after being deflected upward at the ribs 44*i*, the engagement pieces 54 enter into the engaging grooves 44*d* by means of its own elasticity and engage the ribs 44*i*, so that the valve body 41 does not rotate in the clockwise direction in FIG. 10, and the projections 44*s* contact the inside of the bent pieces 53, resulting in the finish of the attachment.

Incidentally, in the state that the valve for detecting the liquid surface is attached to the bracket 51 as described above, the surrounding wall through-holes 44*h* are disposed above a waterline or fuel line when the valve member 11 closes the orifice 43.

Also, since the operations are same as in the first embodiment, the explanation therefor is omitted herewith.

As described above, in the third embodiment of the invention, the same effects as in the first embodiment can be obtained.

And, since the ribs 44*i* are disposed on the edge portions of the surrounding wall through-holes 44*h* on the outer periphery of the surrounding wall part of the valve body 41, the surrounding wall part, the strength of which is deteriorated by providing the surrounding wall through-holes 44*h*, can be reinforced. Therefore, the strength of the surrounding wall part can be maintained.

Further, since the ribs 44*i* also serve as the attachment flanges, the structure of the valve for detecting the liquid surface is simplified.

Also, on the outer periphery of the surrounding wall part between the attachment portion 44*f* and the rib 44*i*, the projections 44*s* are formed to contact the bent pieces 53 of the bracket 51 and to provide the space between the surrounding wall part of the valve body 41 and each of the bent pieces 53. Thus, the valve for detecting the liquid surface attached to the bracket 51 can be prevented from being shaky. Further, the surrounding wall through-holes 44*h* are not closed, and the flowing areas of the surrounding wall through-holes 44*h* through which the fuel vapor passes can be obtained sufficiently. Therefore, by disposing the surrounding wall through-holes 44*h* in the upper side, the storage amount of the fuel can be increased.

Moreover, since the surrounding wall through-holes 44*h* are located above the waterline when the valve member 11 closes the orifice 43, air or vapor flow resistance through the surrounding wall through-holes 44*h* due to ascent of the liquid surface and closing of the surrounding wall through-holes 44*h* is prevented.

In the aforementioned embodiments, it is explained that the relationship among the respective diameters is set to be $D_1>D_2>D_3>D_4$, but in case a relationship of the diameters is set to be $D_1>D_2 \geq D_3 \geq D_4$, the same effects can be obtained.

Also, it is explained that the relationship among the aforementioned areas is set to be $S_4>S_1$, $S_3$, but in case a relationship of the areas is set to be $S_4 \geq S_1$, $S_3$, the same effects can be obtained.

Further, it is explained that the valve member 11 is formed of the first float 12 and the second float 16 and is provided with the secondary orifice 13*o*, but in case the secondary orifice is not disposed in the valve member, even if the relationship of the diameters is $D_1 \geq D_3 \geq D_4$, the same effects can be obtained.

Although the embodiments have been explained as the valves for detecting full fuel in the fuel tank, it is needless to say that the embodiments can be used as a valve device, such as a cut valve, wherein as a float ascends by the ascent of the liquid surface in a container, communication between an outside and the container is cut.

As explained above, according to the invention, since the diameter of the orifice is larger than the surrounding wall through-hole and the diameter of the bottom through-hole, foreign substances which clog the orifice do not enter into the valve body, so that the orifice is not clogged.

Also, the valve member is formed of the first float having the secondary orifice communicating with the orifice when the orifice is closed, and the second float for opening and closing the secondary orifice, and additionally, the diameter of the secondary orifice is larger than the diameter of the bottom through-hole. Thus, foreign substances which clog the secondary orifice do not enter into the valve body through the bottom through-holes, resulting in that the secondary orifice is not clogged.

Moreover, since the diameter of the secondary orifice is larger than the diameter of the surrounding wall through-hole, the foreign substances which clog the secondary orifice do not enter into the valve body, so that the secondary orifice is not clogged.

Also, since the total areas of the surrounding wall through-holes are set to be larger than the total areas of the bottom through-holes, in case fuel is supplied to the fuel tank, the fuel vapor flows into the valve body mainly through the surrounding wall through-holes, resulting in that the valve member is hardly lifted by the pressure of the fuel vapor flowing from the fuel tank.

Moreover, since the valve member in the lowest descending position is located lower than the surrounding wall through-holes, a part of the fuel vapor flowing into the valve body pushes down the valve member, so that the valve member is not lifted so easily by the fuel vapor flowing out from the fuel tank. Consequently, the flowing areas of the surrounding wall through-holes through which the fuel vapor passes can be obtained sufficiently.

Also, since the total areas of the surrounding wall through-holes are set to be more than twice of the area of the opening of the orifice and at the same time the total areas of the bottom through-holes 7h are set to be less than a half of the area of the opening of the orifice, the valve member can not be lifted and the flowing areas of the surrounding wall through-holes through which the fuel vapor passes can be obtained sufficiently.

Further, since the diameter of the bottom through-hole is set to be larger than the diameter of the surrounding wall through-hole, the foreign substances flowing through the surrounding wall through-holes into the valve body flow out of the valve body through the bottom through-holes 7h. Therefore, the foreign substances do not accumulate on the bottom of the valve body.

Also, since the rib is provided on the rim of the surrounding wall through-holes on the outer periphery of the surrounding wall part of the valve body, the surrounding wall part which is deteriorated in strength by providing the surrounding wall through-holes can be reinforced, so that the strength of the surrounding wall part can be maintained.

Furthermore, since the outer surface of the surrounding wall part between the attachment portion and the attachment flange is provided with the projections contacting a part of the fuel tank and providing the space between the surrounding wall part of the valve body and the fuel tank, the valve for detecting the liquid surface attached to the fuel tank can be prevented from being shaky. Also, since the surrounding wall through-holes are not closed, and the flowing areas of the surrounding wall through-holes through which the fuel vapor passes can be obtained sufficiently, the storage amount of fuel can be increased by disposing the surrounding wall through-holes in the upper side.

Moreover, since the surrounding wall through-holes are located above the waterline when the valve member closes the orifice, it is prevented that the surrounding wall through-holes are closed due to ascent of the liquid surface to thereby increase an air resistance.

While the invention has been explained with reference to the specific embodiments of the invention, the explanation is illustrative and the invention is limited only by the appended claims.

What is claimed is:

1. A valve for detecting a liquid surface, comprising:

a valve body formed of an upper part having an orifice with a diameter $D_1$; a bottom part having a plurality of bottom through-holes with a diameter $D_3$; and a surrounding wall part situated between the upper part and the bottom part and having a plurality of surrounding wall through-holes with a diameter $D_4$, said diameters having relations of $D_1 > D_3 > D_4$, a valve member movably disposed inside the valve body to open and close the orifice, said valve member being formed of a first float having a secondary orifice with a diameter $D_2$ for communicating with the orifice when the orifice is closed, said diameter $D_2$ being less than the diameter $D_1$ and greater than the diameter $D_3$, a sealing member disposed on the first float for opening and closing the orifice without closing the secondary orifice, and a second float for opening and closing the secondary orifice to be able to move separately from the first float in an axial direction of the valve member, said second float having a cylindrical upper side with a concave portion for substantially completely accommodating the first float therein when the first float is located in the concave portion, a valve head located in a center of the concave portion for opening and closing the secondary orifice and a lower side situated under the upper side, said second float being located generally below the surrounding wall through-holes when the second float is located at a lowest position in the valve body so that when vapor enters into the valve body through the surrounding wall through-holes, the valve member including the first and second floats does not substantially rise to close the orifice, and an urging member for moving the valve member in cooperation with buoyancy of the valve member so as to close the orifice, said urging member being located between the bottom part and the lower side of the valve member.

2. A valve according to claim 1, wherein an area of the orifice is $S_1$; total areas of the bottom through-holes are $S_2$; and total areas of the surrounding wall through-holes are $S_3$, the total areas $S_3$ being greater than the area $S_1$ and the total areas $S_2$.

3. A valve according to claim 2, wherein second float includes a middle part between the upper and lower parts, said middle part having a plurality of through-holes to allow communication between the upper and lower parts.

4. A valve according to claim 3, wherein said valve member further includes a cap attached to the first float to hold the sealing member on the first float.

5. A valve for detecting a liquid surface, comprising:

a valve body formed of an upper part having an orifice; a bottom part having a plurality of bottom through-holes;

and a surrounding wall part situated between the upper part and the bottom part and having a plurality of surrounding wall through-holes formed in axial and peripheral directions of the valve body, a valve member movably disposed inside the valve body to open and close the orifice, said valve member being formed of a first float having a secondary orifice for communicating with the orifice when the orifice is closed, and a second float for opening and closing the secondary orifice disposed under the first float to be able to move separately from the first float in the axial direction, said first float being smaller than the second float in size and located generally below the surrounding wall through-holes when the first float is located at a lowest position, said second float having an upper wall portion substantially completely surrounding the first float when the first float is located in the lowest position, total areas of said surrounding wall through-holes located above the first float when the first float is located at the lowest position being greater than total areas of the bottom through-holes so that when vapor enters into the valve body through the surrounding wall through-holes, the valve member does not substantially rise to close the orifice, and an urging member for moving the valve member in cooperation with buoyancy of the valve member so as to close the orifice.

6. A valve according to claim 5, wherein said valve member further includes a sealing member disposed on the first float without closing the secondary orifice, said sealing member being engageable with the orifice to close the same, and a cap attached to the first float to hold the sealing member on the first float.

* * * * *